United States Patent
Wang et al.

(10) Patent No.: US 9,641,854 B2
(45) Date of Patent: May 2, 2017

(54) COUNT TABLE MAINTENANCE APPARATUS FOR MAINTAINING COUNT TABLE DURING PROCESSING OF FRAME AND RELATED COUNT TABLE MAINTENANCE METHOD

(71) Applicant: MEDIATEK INC., Hsin-Chu (TW)

(72) Inventors: Sheng-Jen Wang, Tainan (TW); Yung-Chang Chang, New Taipei (TW); Chia-Yun Cheng, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 168 days.

(21) Appl. No.: 14/712,900

(22) Filed: May 14, 2015

(65) Prior Publication Data
US 2015/0334387 A1   Nov. 19, 2015

Related U.S. Application Data (60) Provisional application No. 62/000,174, filed on May 19, 2014, provisional application No. 62/091,082, filed on Dec. 12, 2014.

(51) Int. Cl.
*H04N 19/10* (2014.01)
*H04N 19/423* (2014.01)
*H04N 19/91* (2014.01)

(52) U.S. Cl.
CPC ........... *H04N 19/423* (2014.11); *H04N 19/91* (2014.11)

(58) Field of Classification Search
CPC .................................................. H04N 19/423
(Continued)

(56) References Cited

U.S. PATENT DOCUMENTS 7,580,585 B2 *  8/2009  Malvar ................... H03M 7/40
                                                      341/59
2015/0237353 A1 *  8/2015  Huang ................ H04N 19/436
                                                      375/240.24
(Continued)

FOREIGN PATENT DOCUMENTS

CN   1359232 A    7/2002
CN   1870733 A   11/2006
(Continued)

OTHER PUBLICATIONS

NPL—Google PAtent search.pdf.*
(Continued)

*Primary Examiner* — William C Vaughn, Jr.
*Assistant Examiner* — Luis Perez Fuentes
(74) *Attorney, Agent, or Firm* — Winston Hsu; Scott Margo (57) ABSTRACT

A count table maintenance apparatus for maintaining a count table referenced to apply a backward adaptation to a probability table. The count table maintenance apparatus includes a count data access interface, at least one buffer, and at least one count data updating circuit. The count data access interface determines a read address and a write address of the storage apparatus. The at least one buffer buffers at least one input count data, wherein the at least one input count data is derived from count data read from the count table according to the read address. The at least one count data updating circuit updates the at least one input count data read from the at least one buffer to generate at least one updated count data, and store the at least one updated count data into the storage apparatus according to the write address.

22 Claims, 7 Drawing Sheets

(58) Field of Classification Search
USPC .................................................. 375/240.02
See application file for complete search history.

(56) References Cited

U.S. PATENT DOCUMENTS

2016/0241863 A1* 8/2016 Wu ........................ H04N 19/70
2016/0360236 A1* 12/2016 Huang ................... H04N 19/91

FOREIGN PATENT DOCUMENTS

| JP | 2000216686 A | 8/2000 |
| JP | 2005191856 A | 7/2005 |

OTHER PUBLICATIONS

"International Search Report" mailed on Jul. 28, 2015 for International application No. PCT/CN2015/079254, International filed: May 19, 2015.

* cited by examiner

COUNT TABLE MAINTENANCE APPARATUS FOR MAINTAINING COUNT TABLE DURING PROCESSING OF FRAME AND RELATED COUNT TABLE MAINTENANCE METHOD

CROSS REFERENCE TO RELATED APPLICATIONS

This application claims the benefit of U.S. provisional application No. 62/000,174 (filed on May 19, 2014) and U.S. provisional application No. 62/091,082 (filed on Dec. 12, 2014). The whole contents of the related applications are incorporated herein by reference.

BACKGROUND

The present invention relates to video encoding/decoding, and more particularly, to a count table maintenance apparatus for maintaining (e.g., dynamically updating) a count table in a storage apparatus during processing of a frame and a related count table maintenance method.

The conventional video coding standards generally adopt a block based coding technique to exploit spatial and temporal redundancy. For example, the basic approach is to divide the whole source frame into a plurality of blocks, perform intra prediction/inter prediction on each block, transform residues of each block, and perform quantization and entropy encoding. Besides, a reconstructed frame is generated in a coding loop to provide reference pixel data used for coding following blocks. For certain video coding standards, in-loop filter(s) may be used for enhancing the image quality of the reconstructed frame.

The video decoder is used to perform an inverse operation of a video encoding operation performed by a video encoder. For example, an entropy encoder in the video encoder is used to generate an encoded bitstream, while an entropy decoder in the video decoder is used to decode the encoded bitstream. The arithmetic coding may be employed by the entropy encoder. Hence, the entropy encoder refers to a probability table to perform the entropy encoding, and the video decoder also refers to the same probability table to perform the entropy decoding. Since the video content is inherently non-stationary in nature, adaptation of the probability table to account for changing statistics is critical in each of the video encoder and the video decoder.

SUMMARY

One of the objectives of the claimed invention is to provide a count table maintenance apparatus for maintaining (e.g., dynamically updating) a count table in a storage apparatus during processing of a frame and a related count table maintenance method.

According to a first aspect of the present invention, an exemplary count table maintenance apparatus for maintaining a count table in a storage apparatus during processing of a frame is disclosed, where the count table is referenced to apply a backward adaptation to a probability table. The count table maintenance apparatus includes a count data access interface, at least one buffer, and at least one count data updating circuit. The count data access interface is arranged to determine a read address and a write address of the storage apparatus for accessing count data in the count table. The at least one buffer is arranged to buffer at least one input count data, wherein the at least one input count data is derived from count data read from the count table according to the read address. The at least one count data updating circuit is arranged to update the at least one input count data read from the at least one buffer to generate at least one updated count data, and store the at least one updated count data into the storage apparatus according to the write address.

According to a second aspect of the present invention, an exemplary count table maintenance method for maintaining a count table in a storage apparatus during processing of a frame is disclosed, where the count table is referenced to apply a backward adaptation to a probability table. The count table maintenance method includes: determining a read address and a write address of the storage apparatus for accessing count data in the count table; buffering at least one input count data, wherein the at least one input count data is derived from count data read from the count table according to the read address; and updating the at least one input count data to generate at least one updated count data, and storing the at least one updated count data into the storage apparatus according to the write address.

According to a third aspect of the present invention, an exemplary backward adaptation apparatus is disclosed. The exemplary backward adaptation apparatus includes a first storage apparatus, a count table maintenance apparatus, and a backward probability update circuit. The first storage apparatus includes a first buffer and a second buffer allocated therein. The first buffer is arranged to store a first probability table involved in processing of a first frame. The second buffer is arranged to store a second probability table selectable for processing of a second frame following the first frame. The count table maintenance apparatus is arranged to maintain a count table, wherein the count table maintenance apparatus comprises at least one count data updating circuit shared for dynamically updating the count table during the processing of the first frame. The backward probability update circuit is arranged to refer to information of the count table and information of the first probability table to calculate the second probability table in the second buffer at an end of the processing of the first frame.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
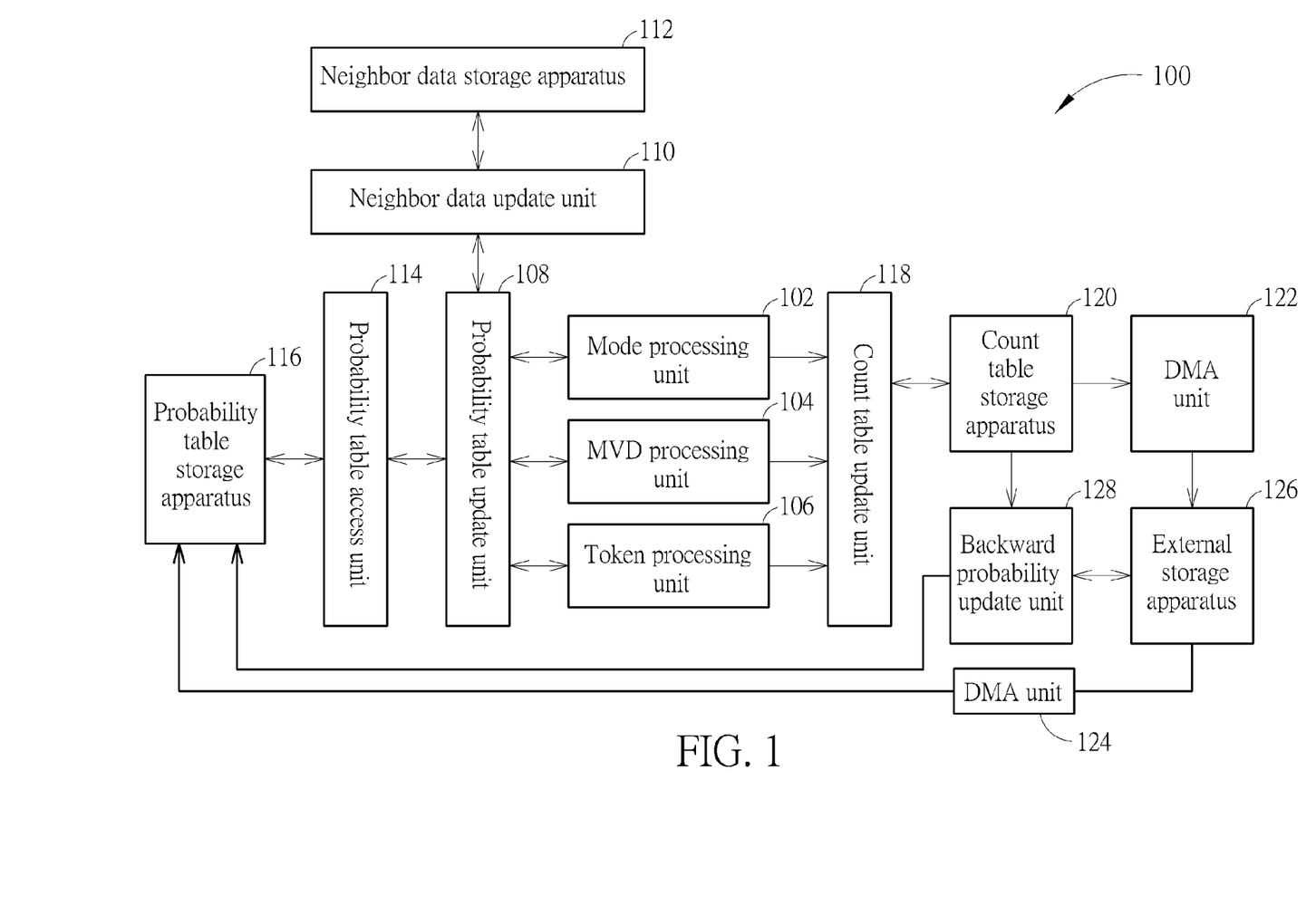
FIG. 1 is a block diagram illustrating an entropy engine according to an embodiment of the present invention.

FIG. 1 is a block diagram illustrating an entropy engine according to an embodiment of the present invention. The entropy engine 100 may be implemented in a video encoder for entropy encoding, or may be implemented in a video decoder for entropy decoding. VP9 is an open and royalty-free video coding standard being developed by Google®. For clarity and simplicity, it is assumed that the entropy engine 100 is arranged to perform entropy encoding/decoding compliant with a VP9 coding standard. However, this is for illustrative purposes only, and is not meant to be a limitation of the present invention. Any video encoder/decoder using the entropy engine 100 (particularly, a proposed count table update unit) falls within the scope of the present invention. The proposed count table update unit serves as a count table maintenance apparatus for maintaining (e.g., dynamically updating) a count table that will be used by backward adaptation of a probability table at the end of encoding/decoding one frame. Further details of the proposed count table update unit are described later.

As shown in FIG. 1, the entropy engine 100 includes circuits, such as a mode processing unit 102, a motion vector difference (MVD) processing unit 104, a token processing unit 106, a probability table update unit 108, a neighbor data update unit 110, a neighbor data storage apparatus 112, a probability table access unit 114, a probability table storage apparatus 116, a count table update unit 118, a count table storage apparatus 120, a plurality of direct memory access (DMA) units 122, 124, an external storage apparatus 126, and a backward probability update unit 128. In this embodiment, the external storage apparatus 126 may be implemented using an off-chip memory such as a dynamic random access memory (DRAM), and each of the neighbor data storage apparatus 112, the probability table storage apparatus 116, and the count table storage apparatus 120 may be implemented using an on-chip (internal) memory such as a static random access memory (SRAM). Alternatively, the external storage apparatus 126 may be implemented using an off-chip memory such as a DRAM, and at least one of the neighbor data storage apparatus 112, the probability table storage apparatus 116, and the count table storage apparatus 120 may be implemented using a buffer allocated in the external storage apparatus (e.g., DRAM) 126.

The probability table storage apparatus 116 is used to store a probability table that is used for syntax encoding/decoding. The neighbor data storage apparatus 112 is used to store information of upper neighbor blocks that is referenced for probability model selection in the probability table. The count table storage apparatus 120 is used to store a count table that records actual counts for each symbol, where the count table composed of count data of various symbols in a current frame is referenced for backward adaptation of the probability table. The external storage apparatus 126 is used to store data needed by circuit element (s) in the entropy engine 100. For example, the DMA unit 122 may transmit the count table maintained by the count table update unit 118 and stored in an internal storage apparatus (e.g., count table storage apparatus 120) to the external storage apparatus 126. For another example, the DMA unit 124 may transmit the probability table calculated by the backward probability update unit 128 and stored in the external storage apparatus 126 to an internal storage apparatus (e.g., probability table storage apparatus 116). The external storage apparatus 126 may have a working buffer allocated therein, such that the backward probability update unit 128 may use the working buffer to compute a new probability table (i.e., an updated probability table) based on an old probability table (i.e., a current probability table) and a count table. Alternatively, the backward probability update unit 128 may read the needed count table from the count table storage apparatus 120 directly, and/or write the new probability table to the probability table storage apparatus 116 directly. Hence, one or both of the DMA units 122 and 124 may be omitted in certain alternative designs.

The probability table access unit 114 is an interface module used to access the probability table stored in the probability table storage apparatus 116. The neighbor data update unit 110 is used to perform neighbor data selection according to the syntax type and some decoded syntax elements of a current block. The probability table update unit 108 is used to refer to the neighbor information provided by the neighbor data update unit 110 to perform probability model selection for determining a probability model used by syntax entropy encoding/decoding such as mode processing, MVD processing, and token processing. The mode processing unit 102 is used to encode/decode the mode-related syntax elements. The MVD processing unit 104 is used to encode/decode the motion vector difference. The token processing unit 106 is used to perform coefficient encoding/decoding to thereby encode/decode tokens, such as single numbers {0, 1, 2, 3, 4}, number ranges {5-6, 7-10, 11-8, 19-34, 35-66, 67+}, and End of Block (EOB). The count table update unit 118 is used to read count data from the count table recorded in the count table storage apparatus 120, update the count data according to the syntax encoding/decoding performed by the mode processing unit 102, the MVD processing unit 104, and the token processing unit 106, and write updated count data into the count table recorded in the count table storage apparatus 120. The count table maintained in the count table storage apparatus 120 is a collection of count data of various symbols in a frame. Hence, the count table update unit 118 is used to perform a read-modify-write operation to dynamically update the count table during encoding/decoding of the frame. The backward probability update unit 128 may be a hardware-based element (e.g., pure hardware dedicated to performing backward probability updating) or a software-based element (e.g., a general-purpose processor that executes a program code to perform backward probability updating), and is used to generate a new probability table (i.e., an updated probability table) according to side information (e.g., syntax types and symbol values), an old probability table (i.e., a current probability table) and a count table.

Figure 2:
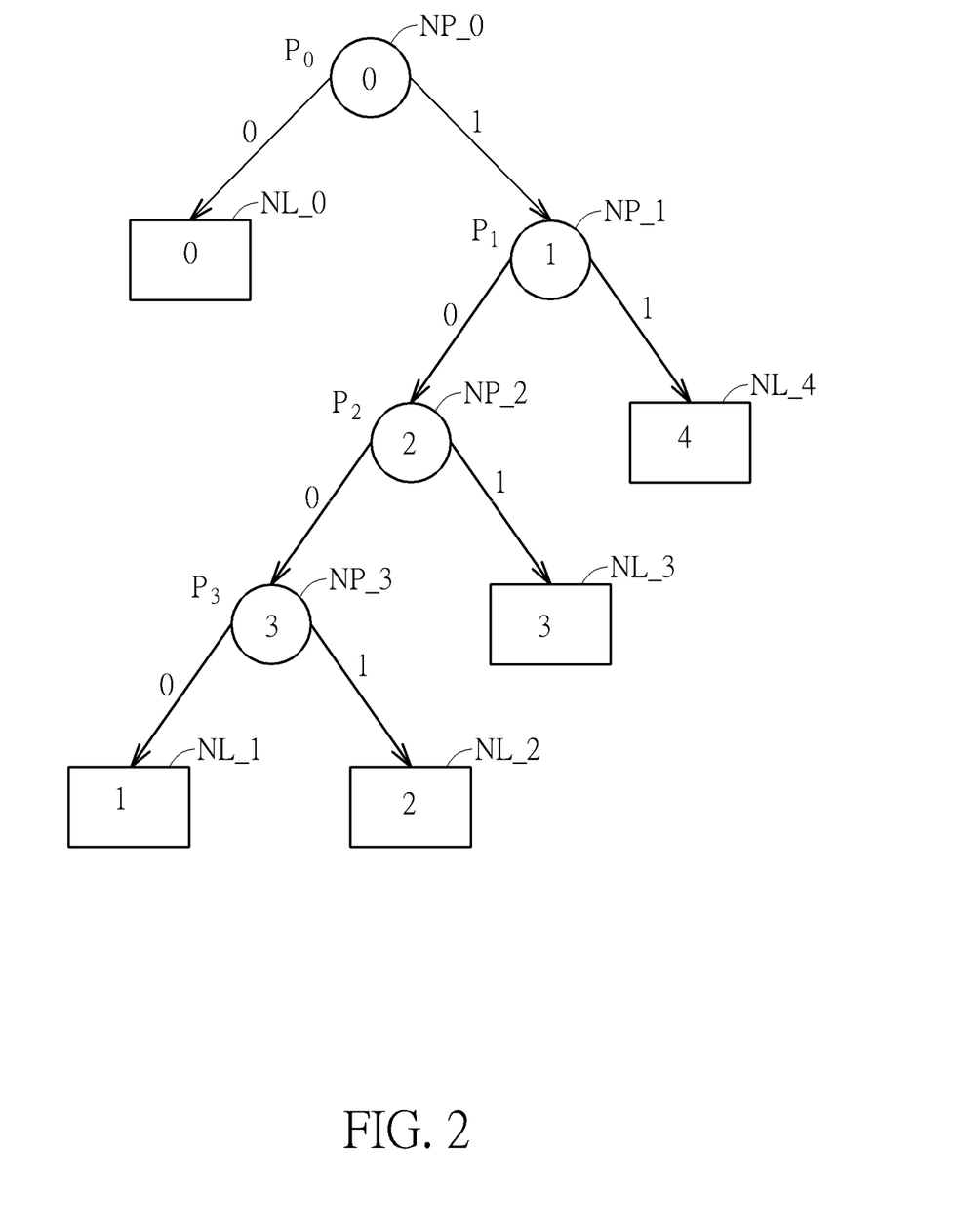
FIG. 2 is a diagram illustrating a binary tree created for a set of symbols according to an embodiment of the present invention.

Except for very few header bits that are encoded directly as raw values, the majority of compressed VP9 data values are encoded using a boolean arithmetic encoder acting as the underlying binary arithmetic encoder. Generally speaking, given a symbol from any n-ary alphabet, a static binary tree is constructed with (n−1) non-leaf nodes (or called parent nodes) and (n) leaf nodes, and the binary arithmetic encoder operates on each non-leaf node as the tree is traversed to encode a particular symbol. FIG. 2 is a diagram illustrating a binary tree created for a set of symbols according to an embodiment of the present invention. In this example, there are 4 non-leaf nodes NP_0, NP_1, NP_2, NP_3 represented by circles, and 5 leaf nodes NL_0, NL_1, NL_2, NL_3, NL_4 represented by squares. Any symbol in the alphabet can be represented by a series of binary values generated by traversing the binary tree from the root node NP_0 to a corresponding leaf node. Each non-leaf node in the binary tree has a probability (e.g., $P_0$, $P_1/P_2$, $P_3$) assigned on the basis of the likelihood of taking the left (0) branch for traversing. The set of probabilities $P_0$-$P_3$ for encoding possible symbols of a specific syntax is referred to as an entropy coding context (or called probability model) of the specific syntax. The video content is inherently non-stationary in nature and a critical element of any video encoder/decoder is the mechanism used to track the statistics of various symbols and update the entropy coding contexts (probability models) of symbols in the probability table to match the actual distribution of the symbols. For example, backward adaptation may be employed to update entropy coding contexts (probability models) at the end of encoding/decoding each frame. In other words, once all symbols in a frame have been processed (e.g., encoded or decoded), a backward adaptation step is conducted to further update the probabilities for use in the next frame according to actual counts for each symbol in the frame. Based on these actual counts, probabilities of various non-leaf nodes in a corresponding binary tree can be obtained. Take the binary tree shown in FIG. 2 as an example. For each of the non-leaf nodes NP_0-NP_3, one count data is generated to indicate the number of occurrence times of 0's, and the other count data is generated to indicate the number of occurrence times of 1's. Hence, based on count data of all non-leaf nodes NP_0-NP_3, new values of the set of probabilities $P_0$-$P_3$ can be obtained and then used by the backward adaptation step to set updated values of the set of probabilities $P_0$-$P_3$ that may be selected for encoding/decoding the next frame.

Figure 3:
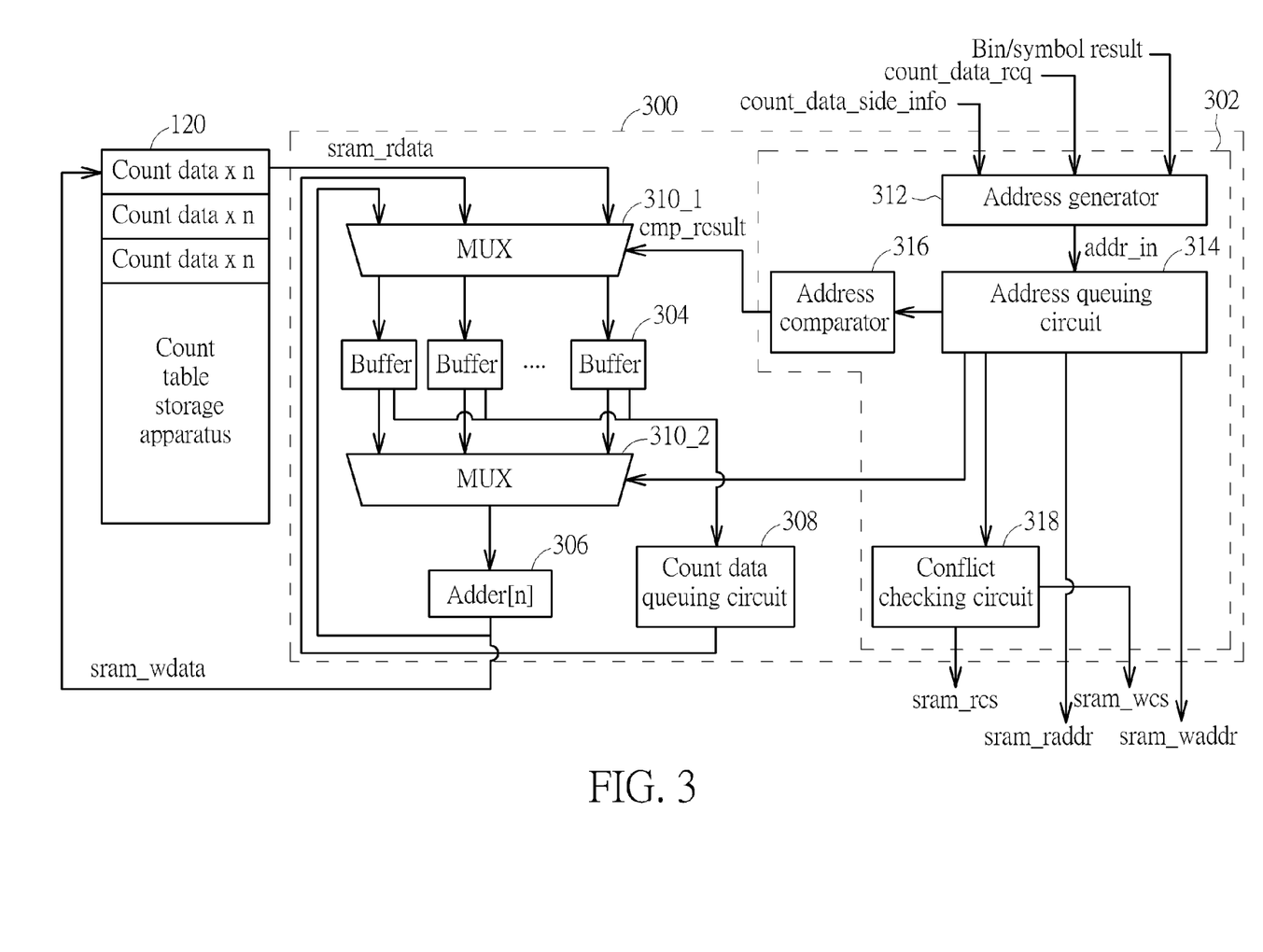
FIG. 3 is a block diagram illustrating a count table update unit according to an embodiment of the present invention.

In this embodiment, the count table update unit 118 serves as a count table maintenance apparatus for maintaining (e.g., dynamically updating) a count table in the count table storage apparatus 120 during processing (e.g., encoding or decoding) of a frame, where the count table is referenced to apply a backward adaptation to a probability table. FIG. 3 is a block diagram illustrating a count table update unit according to an embodiment of the present invention. The count table update unit 118 shown in FIG. 1 may be implemented using the count table update unit 300 shown in FIG. 3. As shown in FIG. 3, the count table update unit 300 includes a count data access interface 302, at least one buffer 304, at least one count data updating circuit (e.g., at least one adder denoted as "Adder [n]") 306, a count data queuing circuit 308, and a plurality of multiplexers 310_1, 310_2. It should be noted that, based on the actual design consideration, the number of buffers 304 may be equal to one or may be larger than one, and/or the number of count data updating circuits (e.g., adders) may be equal to one or may be larger than one. As mentioned above, the count table storage apparatus 120 is used to store a count table composed of count data of symbols of various syntax types in one frame. For example, the count table storage apparatus 120 may be an internal SRAM, and each storage entry may store multiple count data (e.g., count data×4).

The count data access interface 302 is an interface module arranged to access (read and write) the count table in the count table storage apparatus 120. For example, the count data access interface 302 determine a read address sram_raddr and a write address sram_waddr of the count table storage apparatus 120 for accessing count data in the count table. In this embodiment, the count data access interface 302 includes an address generator 312, an address queuing circuit 314, an address comparator 316, and a conflict checking circuit 318. The address generator 312 is used to employ an address derivation algorithm to generate a count data access address setting addr_in, including the read address sram_raddr and the write address sram_waddr, according to side information count_data_side_info (which may indicate the syntax type and other reference information), a control signal count_data_req (which may trigger the count data access), and the bin/symbol result (which may be generated by the entropy engine 100 shown in FIG. 1). For example, the address derivation algorithm employed by the address generator 312 may derive one or both of read address and write address from a decoded bin value (or a decoded symbol value) and the decoded syntax type. For another example, the address derivation algorithm employed by the address generator 312 may further refer to other side information, such as one or more of a picture type, a reference type, a transform size, a coefficient band, etc. The address queuing circuit 314 is used to queue previous count data access addresses for pipelined count data updating. The address comparator 316 is used to check address equivalence in the address queuing circuit 314, and generate a comparison result cmp_result to the multiplexer (MUX) 310_1, where the multiplexer 310_1 is controlled to select the previous count data queued in the count data queuing circuit 308 for pipelined count data updating, or select the updated count data generated from the at least one count data updating circuit (denoted as "Adder [n]") 306, or select the count data sram_rdata read from the count table storage apparatus 120. It should be noted that the address queuing circuit 314 and the count data queuing circuit 308 may be optional. For example, the count data update unit 300 may be modified to have no pipelined count data updating function. Hence, the address queuing circuit 314 and the count data queuing circuit 308 may be omitted.

The conflict checking circuit 318 is used to check if the read access and the write access are directed to the same address concurrently, and set the read access enable signal sram_rcs and the write access enable signal sram_wcs according to a conflict checking result. When the read-write conflict is detected, the conflict checking circuit 318 sets the write access enable signal sram_wcs to disable the write access, and sets the read access enable signal sram_rcs to enable the read access. However, when the read-write conflict is not detected, the conflict checking circuit 318 sets the write access enable signal sram_wcs to enable the write access, and sets the read access enable signal sram_rcs to enable the read access.

The count data sram_rdata in the count table storage apparatus 120 is read from the read address sram_raddr and transmitted to the count table update unit 300. In other words, the count table storage apparatus 120 outputs at least one stored count data sram_rdata in response to the read address sram_raddr determined by the count table update unit 300. In this embodiment, the multiplexer 310_1 is used to select a target count data update source from a plurality of candidate count data update sources, where the candidate count data update sources may include at least one current count data (i.e., sram_rdata) read from the storage apparatus 120, at least one previous count data queued in the count data queuing circuit 308, and at least one previously updated count data generated by the at least one count data updating circuit 306.

The at least one buffer 304 is used to buffer at least one input count data, wherein the at least one input count data buffered in the at least one buffer 304 is derived from count data read from the count table according to a read address. When the selected count data update source is the at least one current count data (i.e., sram_rdata) read from the storage apparatus 120, the multiplexer 310_1 outputs the at least one current count data (which is read from the count table according to a current read address) to the at least one buffer 304. When the selected count data update source is the at least one previous count data queued in the count data queuing circuit 308, the multiplexer 310_1 outputs the at least one previous count data (which is read from the count table according to a previous read address) to the at least one buffer 304. When the selected count data update source is the at least one previously updated count data, the multiplexer 310_1 outputs the at least one previously updated count data (which is generated by the at least one count data updating circuit 306 according to a previous count data read from the count table according to a previous read address) to the at least one buffer 304.

It should be noted that the number of candidate count data update sources may be adjusted, depending upon actual design consideration. In a first alternative design, the candidate count data update sources may include at least one current count data (i.e., sram_rdata) read from the storage apparatus 120 and at least one previous count data queued in the count data queuing circuit 308. In a second alternative design, the candidate count data update sources may include at least one current count data (i.e., sram_rdata) read from the storage apparatus 120 and at least one previously updated count data generated by the at least one count data updating circuit 306. In a third alternative design, the candidate count data update sources may include at least one previous count data queued in the count data queuing circuit 308 and at least one previously updated count data generated by the at least one count data updating circuit 306.

In a case where the number of buffers 304 is larger than the number of count data updating circuits (e.g., adders) 306, the multiplexer 310_2 is implemented to select which buffered count data is output to the at least one count data updating circuit 306. In this embodiment, the multiplexer 310_2 is controlled by the count data access interface 302, and each count data updating circuit 306 is implemented using an adder. Hence, the adder may add an increment value (e.g., 1) to one buffered count data for generating one updated count data. To put it simply, the at least one count data updating circuit 306 is used to update the at least one input count data read from the at least one buffer 304 to thereby generate at least one updated count data, and store the at least one updated count data sram_wdata into the count table storage apparatus 120 according to the write address sram_waddr set by the count data access interface 302.

In another case where the number of buffers 304 is equal to the number of count data updating circuits (e.g., adders) 306, the multiplexer 310_2 may be omitted. For example, the count table update unit 300 may be configured to have only a single buffer 304 used to buffer a single input count data, and further have only a single count data updating circuit (e.g., a single adder) 306 used to update the single input count data. For another example, the count table update unit 300 may be configured to have a plurality of buffers 304 used to buffer a plurality of input count data, and further have a plurality of count data updating circuits (e.g., a plurality of adders) 306 used to update the plurality of input count data, respectively.

During encoding/decoding of one frame, the proposed count table update unit 300 writes updated count data of each symbol into the count table storage apparatus 120, and reads stored count data of each symbol from the count table storage apparatus 120. The count data of different symbols may be set by initial values (e.g., 0) at the beginning of encoding/decoding a frame. In this embodiment, the count data update unit 300 performs a read-modify-write operation to dynamically update count data in the count table. Specifically, the at least one count data updating circuit 306 is shared for updating count data of different symbols during encoding/decoding of the frame. Hence, the number of the at least one count data updating circuit 306 is smaller than the number of count data recorded in the count table for different symbols in the frame.

The backward adaptation of the probability table is performed at the end of encoding/decoding a frame to calculate a new probability table (i.e., an updated probability table) based on an old probability table (e.g., a current probability table) and a count table. Several backward adaptation designs for updating the probability table are given as below.

Figure 4:
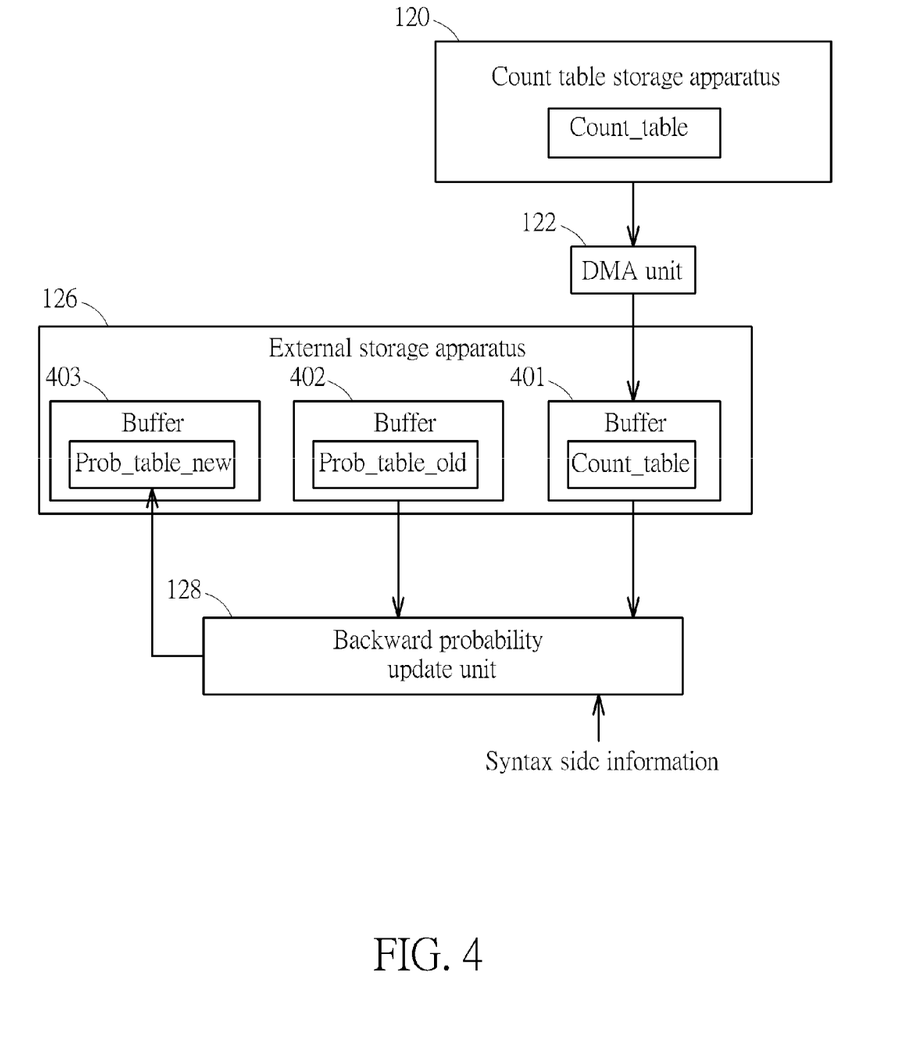
FIG. 4 is a block diagram illustrating a first backward adaptation design according to an embodiment of the present invention.

FIG. 4 is a block diagram illustrating a first backward adaptation design according to an embodiment of the present invention. The count table Count_table maintained in the count table storage apparatus 120 (which may be an on-chip SRAM) is transmitted to a buffer 401 allocated in the external storage apparatus 126 (which may be an off-chip DRAM) through the DMA unit 122. An old probability table Prob_table_old is stored in a buffer 402 allocated in the external storage apparatus 126. The old probability table Prob_table_old may be loaded into the probability table storage apparatus 116 through the DMA unit 124 for use in the previous frame encoding/decoding. At the end of encoding/decoding the previous frame, the backward probability update unit 128 reads information of the count table Count_table in the buffer 401 and information of the old probability table Prob_table_old in the buffer 402, and refers to the information of the count table Count_table and the old probability table Prob_table_old to calculate a new probability table Prob_table_new for use in the current frame encoding/decoding. The external storage apparatus 126 further has a buffer 403 allocated therein for acting as a working buffer needed by the backward probability update unit 128 to store intermediate computation results and final computation results of the new probability table Prob_table_new.

Figure 5:
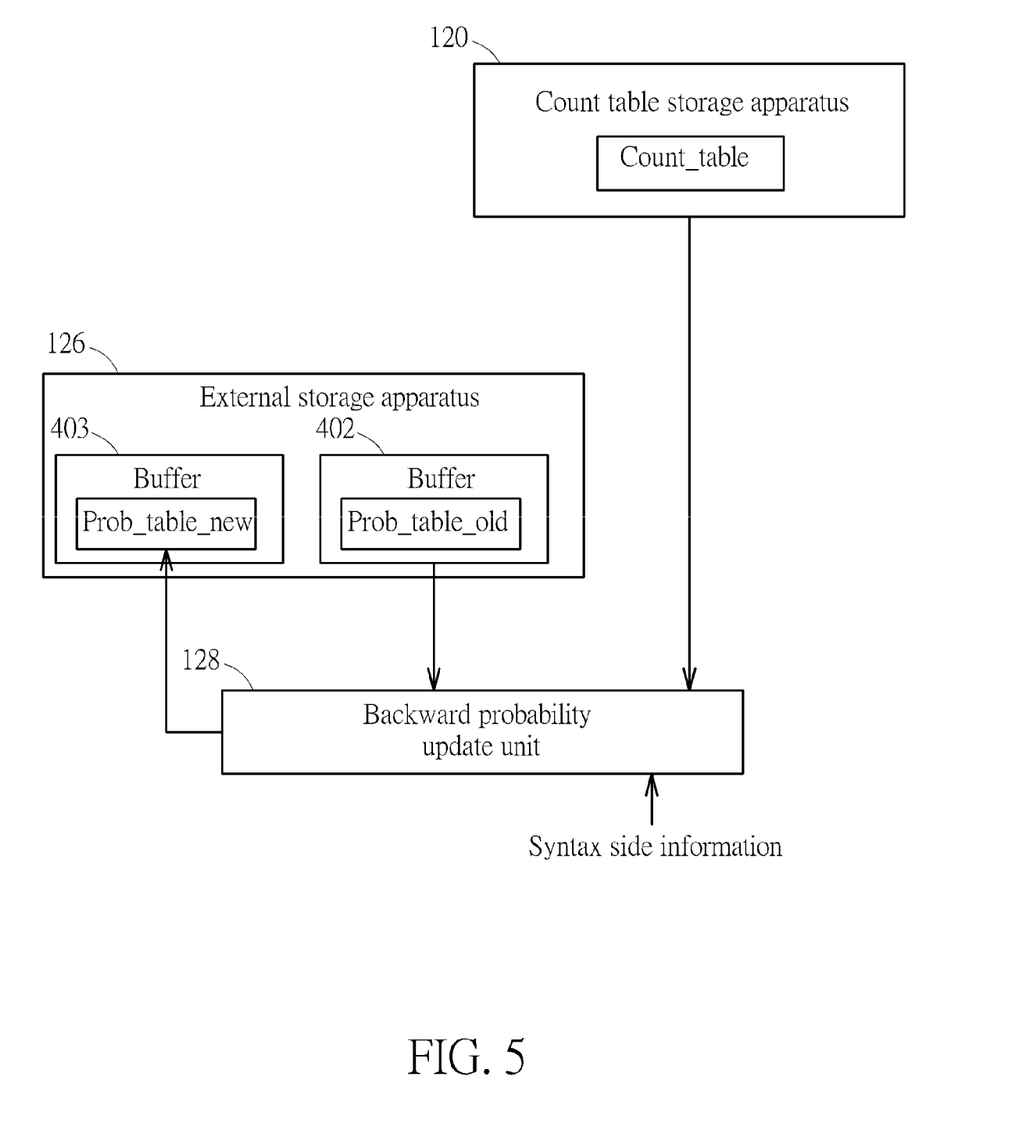
FIG. 5 is a block diagram illustrating a second backward adaptation design according to an embodiment of the present invention.

FIG. 5 is a block diagram illustrating a second backward adaptation design according to an embodiment of the present invention. The major difference between the backward adaptation designs in FIG. 4 and FIG. 5 is that the backward probability update unit 128 of the backward adaptation design in FIG. 5 reads information of the count table Count_table from the count table storage apparatus 120 (which may be an on-chip SRAM) directly.

Figure 6:
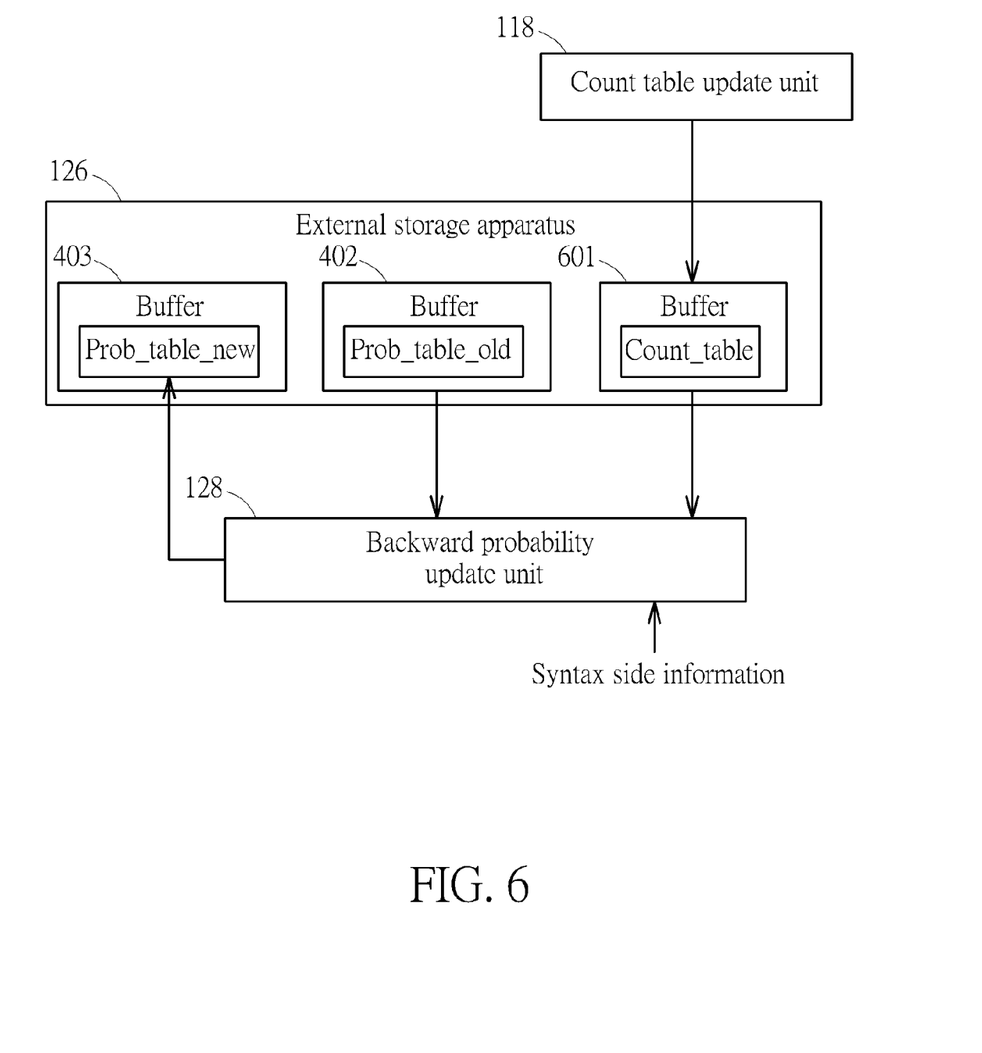
FIG. 6 is a block diagram illustrating a third backward adaptation design according to an embodiment of the present invention.

FIG. 6 is a block diagram illustrating a third backward adaptation design according to an embodiment of the present invention. The major difference between the backward adaptation designs in FIG. 5 and FIG. 6 is that the aforementioned count table storage apparatus 120 may be implemented using a buffer 601 allocated in the external storage apparatus 126 (which may be an off-chip DRAM). That is, the count table storage apparatus 120 is part of the external storage apparatus 126. Hence, in this embodiment, the DMA unit 122 can be omitted, and the count table update unit 118 is arranged to access the external storage apparatus 126 for maintaining a count table needed by backward adaption of the probability table.

Figure 7:
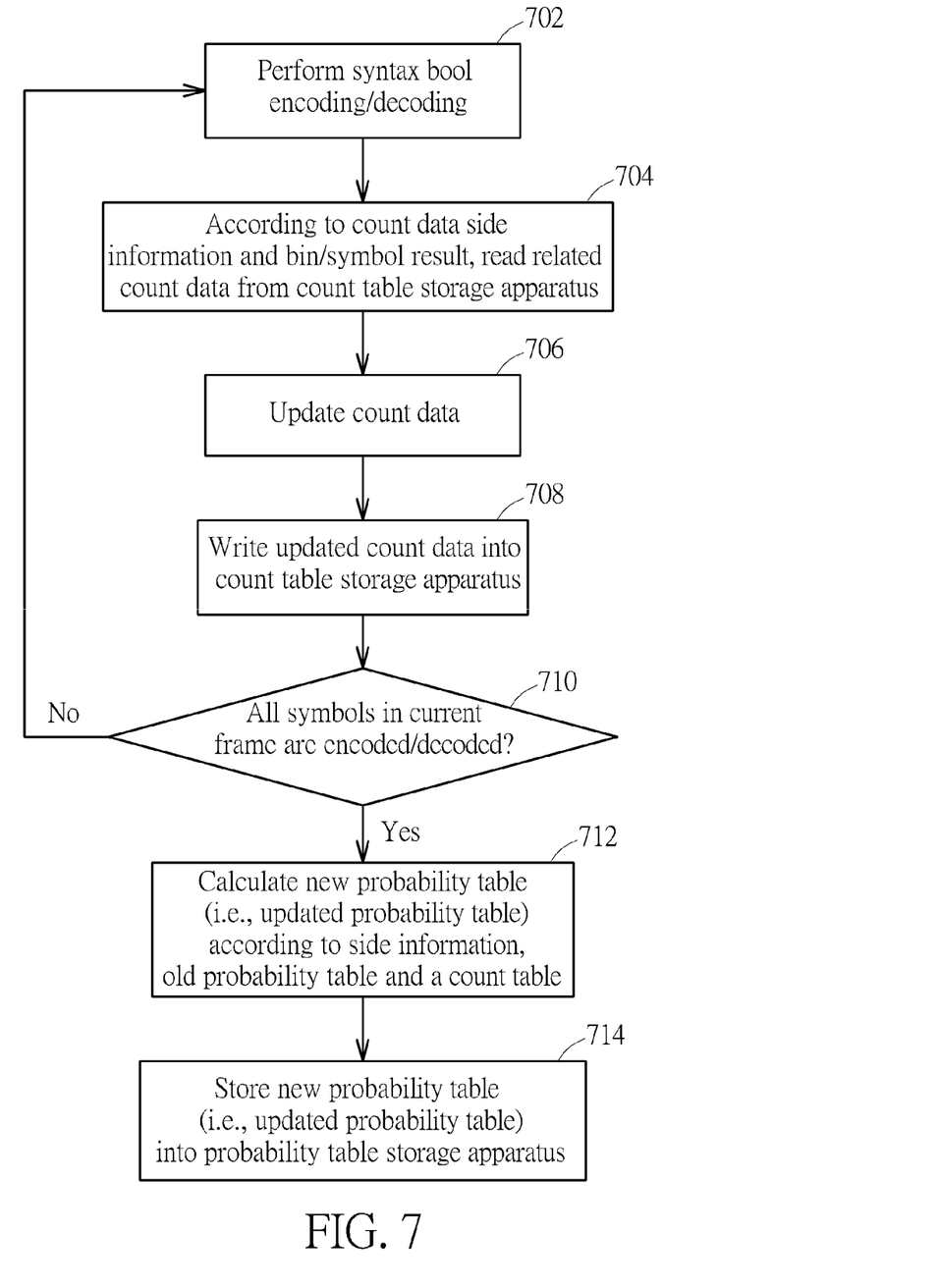
FIG. 7 is a flowchart illustrating an entropy processing method according to an embodiment of the present invention.

FIG. 7 is a flowchart illustrating an entropy processing method according to an embodiment of the present invention. Provided that the result is substantially the same, the steps are not required to be executed in the exact order shown in FIG. 7. The entropy processing method may be employed by the entropy engine 100 shown in FIG. 1, and may be briefly summarized as below.

Step 702: Perform syntax bool encoding/decoding.

Step 704: According to count data side information and bin/symbol result, read related count data from a count table storage apparatus.

Step 706: Update the count data.

Step 708: Write the updated count data into the count table storage apparatus.

Step 710: Check if all symbols in a current frame are encoded/decoded. If yes, go to step 712; otherwise, go to step 702 to process the next symbol.

Step 712: Calculate a new probability table (i.e., an updated probability table which may be selected for encoding/decoding the next frame) according to side information, an old probability table (i.e., a current probability table that is used for encoding/decoding the current frame), and a count table maintained in the count table storage apparatus.

Step 714: Store the new probability table (i.e., updated probability table) into a probability table storage apparatus.

Steps 702 may be performed by one of the mode processing unit 102, the MVD processing unit 104, and the token processing unit 106. Steps 704-708 may be performed by the count table update unit 118/300. The proposed count table maintenance method (steps 704-708) is part of a video encoding procedure when employed at the video encoder side, or is part of a video decoding procedure when employed at the video decoder side. Steps 710-714 may be performed by the backward probability update unit 128. As a person skilled in the art can readily understand details of each step shown in FIG. 7 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A count table maintenance apparatus for maintaining a count table in a storage apparatus during processing of a frame, the count table maintenance apparatus comprising:
    a count data access interface, arranged to determine a read address and a write address of the storage apparatus for accessing count data in the count table,
        wherein the count table is referenced to apply a backward adaptation to a probability table;
    at least one buffer, arranged to buffer at least one input count data,
        wherein the at least one input count data is derived from count data read from the count table according to the read address; and
    at least one count data updating circuit, arranged to update the at least one input count data read from the at least one buffer to generate at least one updated count data, and
    store the at least one updated count data into the storage apparatus according to the write address.

2. The count table maintenance apparatus of claim 1, wherein a number of the at least one count data updating circuit is smaller than a number of count data recorded in the count table for different symbols in the frame.

3. The count table maintenance apparatus of claim 1, wherein the count table maintenance apparatus has a plurality of buffers arranged to buffer a plurality of input count data, respectively.

4. The count table maintenance apparatus of claim 3, wherein the count table maintenance apparatus has a plurality of count data updating circuits arranged to update the plurality of input count data, respectively.

5. The count table maintenance apparatus of claim 1, further comprising:
    a count data queuing circuit, arrange to queue at least one previous count data; and
    a multiplexer, arranged to receive at least one current count data read from the storage apparatus and the at least one previous count data queued in the count data queuing circuit, and
    output the at least one current count data or the at least one previous count data to act as the at least one input count data.

6. The count table maintenance apparatus of claim 1, further comprising:
    a multiplexer, arranged to receive at least one previously updated count data generated by the at least one count data updating circuit and at least one current count data read from the storage apparatus, and
    output the at least one current count data or the at least one previously updated count data to act as the at least one input count data.

7. The count table maintenance apparatus of claim 1, further comprising:
    a count data queuing circuit, arrange to queue at least one previous count data; and
    a multiplexer, arranged to receive at least one previously updated count data generated by the at least one count data updating circuit and the at least one previous count data queued in the count data queuing circuit, and
    output the at least one previous count data or the at least one previously updated count data to act as the at least one input count data.

8. The count table maintenance apparatus of claim 1, wherein the count table maintenance apparatus is part of a video decoder.

9. The count table maintenance apparatus of claim 1, wherein the count table maintenance apparatus is part of a video encoder.

10. The count table maintenance apparatus of claim 1, wherein the backward adaptation complies with a VP9 coding standard.

11. The count table maintenance apparatus of claim 1, wherein the count data access interface determines at least one of the read address and the write address according to a syntax type and one of a bin result and a symbol result.

12. A count table maintenance method for maintaining a count table in a storage apparatus during processing of a frame, the count table maintenance method comprising:
    determining a read address and a write address of the storage apparatus for accessing count data in the count table,
        wherein the count table is referenced to apply a backward adaptation to a probability table;
    buffering at least one input count data, wherein the at least one input count data is derived from count data read from the count table according to the read address; and updating the at least one input count data to generate at least one updated count data, and storing the at least one updated count data into the storage apparatus according to the write address.

13. The count table maintenance method of claim 12, wherein updating the at least one input count data comprises:

utilizing at least one count data updating circuit for updating the at least one input count data to generate at least one updated count data, wherein a number of the at least one count data updating circuit is smaller than a number of count data recorded in the count table for different symbols in the frame.

14. The count table maintenance method of claim 12, wherein buffering the at least one input count data comprises: utilizing a plurality of buffers arranged to buffer a plurality of input count data, respectively.

15. The count table maintenance method of claim 14, wherein updating the at least one input count data comprises: utilizing a plurality of count data updating circuits for updating the plurality of input count data, respectively.

16. The count table maintenance method of claim 12, further comprising:

queuing at least one previous count data; and performing a multiplexing operation upon at least one current count data read from the storage apparatus and the at least one previous count data for outputting the at least one current count data or the at least one previous count data to act as the at least one input count data.

17. The count table maintenance method of claim 12, further comprising:

performing a multiplexing operation upon at least one current count data read from the storage apparatus and at least one previously updated count data for outputting the at least one current count data or the at least one previously updated count data to act as the at least one input count data.

18. The count table maintenance method of claim 12, further comprising:

queuing at least one previous count data; and performing a multiplexing operation upon at least one previously updated count data and the at least one previous count data for outputting the at least one previous count data or the at least one previously updated count data to act as the at least one input count data.

19. The count table maintenance method of claim 12, wherein the count table maintenance method is part of a video decoding procedure.

20. The count table maintenance method of claim 12, wherein the count table maintenance method is part of a video encoding procedure.

21. The count table maintenance method of claim 12, wherein the backward adaptation complies with a VP9 coding standard.

22. The count table maintenance method of claim 12, wherein determining the read address and the write address of the storage apparatus comprises:

determining at least one of the read address and the write address according to a syntax type and one of a bin result and a symbol result.

* * * * *